Jan. 5, 1965 K. W. SCHROEDER 3,164,753
MAGNETIC CHUCK DEMAGNETIZER
Filed March 13, 1956 3 Sheets-Sheet 1

Inventor
Kenneth W. Schroeder
by Attys

Jan. 5, 1965 K. W. SCHROEDER 3,164,753
MAGNETIC CHUCK DEMAGNETIZER
Filed March 13, 1956 3 Sheets-Sheet 2

Inventor
Kenneth W. Schroeder

United States Patent Office 3,164,753
Patented Jan. 5, 1965

3,164,753
MAGNETIC CHUCK DEMAGNETIZER
Kenneth W. Schroeder, Mount Prospect, Ill., assignor, by mesne assignments, to Magnaflux Corporation, Chicago, Ill., a corporation of Delaware
Filed Mar. 13, 1956, Ser. No. 571,208
22 Claims. (Cl. 317—123)

This invention relates to a magnetic demagnetizer control system and method, and particularly to a magnetic demagnetizer adapted for operation with magnetic chunks and the like.

Since the time spent demagnetizing a magnetic chuck and the work pieces on the chuck does not contribute to productivity, it is essential that this time be kept to a minimum. The present invention provides a magnetic chuck demagnetizer which greatly reduces the time required to complete a demagnetizing operation, and for example, may require approximately 6 seconds elapsed time to complete demagnetization, while comparable units that are now available require from 10 to 80 seconds to complete the same demagnetizing operation.

It is also important to have a demagnetizer wherein the value of the initial demagnetizing magnetic field is readily adjustable. For example, in a magnetic chuck the mechanical vibration of the work piece which is being magnetically held to the chuck will in some instances result in a stronger residual magnetic field in the work piece than would be realized without the mechanical vibration. Accordingly, proper demagnetization of the work piece may require that the first current pulse from the demagnetizer be adjusted to be of greater magnitude than the value of steady state current used for magnetizing the chuck and work piece.

Also on some magnetic chucks the time constant is a function of the area of chuck surface covered by work pieces so that a fully loaded chuck would present a relatively large time constant. The demagnetizer of the present invention provides a tap switch in conjunction with a tapped transformer so that the voltage applied to the demagnetizing winding of the chuck may be increased when a larger area of the chuck surface is covered by work pieces. In this way the same interval of time is required for demagnetization regardless of the time constant involved; and at the same time, there is no appreciable loss in applied energy as the voltage is reduced to adjust the demagnetizer to a less fully loaded chuck.

The present invention is also designed to keep self-induced voltages at a minimum during switching operations. High self-induced voltages may cause the insulation on the demagnetizing winding to break down; and the resulting short circuit renders the magnetic chuck inoperative and may also create a fire hazard. In the demagnetizer of the present invention, the current pulses are terminated by initially breaking the circuit on the primary side of the transformer so that a complete low impedance path is maintained on the secondary side of the transformer to minimize the voltage induced in the demagnetizing winding during the initial current interruption.

It is desirable to reduce the holding power of a magnetic chuck when parts which might be deformed under full holding power are placed upon the surface of the chuck for a machining operation. Some prior art devices rely upon the residual magnetic field which is present in the magnetic circuit after the power has been turned off for such applications. However, if the part is momentarily separated from the surface of the chuck during a machining operation, the residual field may be permanently reduced to a very low value with a consequent loss of holding power and danger of injury to personnel. The demagnetizer of the present invention provides for adjusting the magnetizing current or holding power of the chuck by means of a tap switch in conjunction with a tapped transformer so that positive holding power is provided at all times even though considerably less than full value.

A further feature of the present invention resides in the fact that the magnetic magnetizing and demagnetizing system of the present invention is completely housed in a single enclosure with the exception of a remote control box which is connected to the main unit by a control cable. The device of the present invention requires only two connections, one to the A.C. power line, and the other to the magnetizing and demagnetizing coil to be energized by the system.

It is therefore an important object of the present invention to provide a magnetic demagnetizer system and method which greatly reduces the time required to complete a given demagnetizing operation.

A further object of the present invention is to provide a demagnetizing system and method wherein the value of the initial demagnetizing current pulse is readily adjustable.

A still further object of the present invention is to provide a magnetic demagnetizer system which is readily adjustable to compensate for different time constants while providing the same total time for the demagnetizing operation and without any substantial energy losses as a result of the adjustment.

It is another and further object of the present invention to provide a magnetic demagnetizer system wherein self-induced voltages are kept to a minimum.

It is yet another important object of the present invention to provide a magnetizing and demagnetizing control system wherein the magnetizing field may be adjusted to relatively low values in a simple and economical manner.

A further object of the present invention resides in the provision of a magnetic magnetizing and demagnetizing system capable of utilizing a power supply with a reduced power rating for given output requirements.

A still further object of the present invention resides in the provision of a relatively simple and unitary magnetizing and demagnetizing system involving a minimum of connections and enclosures.

Other important objects, features and advantages of the present invention will become apparent from the following detailed description of a preferred embodiment thereof taken in connection with the accompanying drawings, in which.

As shown on the drawings.

The present invention will be described as it would be applied to a magnetic chuck for supplying the magnetizing and demagnetizing current thereto. However, it will be apparent to those skilled in the art that the invention has many other applications particularly where the problem of supplying current pulses of progressively diminishing intensity to an inductance means is involved.

Theory of Operation

Figure 3:
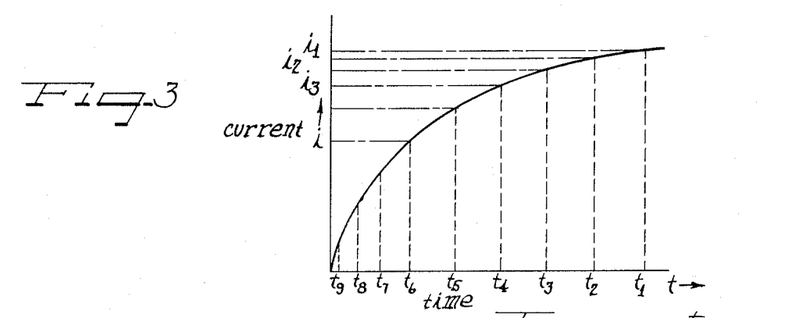
FIGURE 3 is a graph of demagnetizing current as a function of time in an inductance and is utilized in describing the principles of the present invention.

Demagnetization of magnetic chucks as well as magnetized parts in general can be accomplished by alternately reversing the polarity of the applied magnetic field while the intensity of the applied magnetic field is gradually reduced. The device of the present invention is unique in that it makes effective use of the fact that in highly inductive circuits the current builds up slowly in response to a suddenly applied voltage. By controlling the duration of an applied substantially constant voltage, the maximum value of current can be controlled. By progressively decreasing the duration of the applied voltage pulse, the maximum value of current will decrease and approach zero. The applied voltage may be successively reversed in polarity as its duration is successively reduced to produce a series of demagnetizing current pulses of alternating polarity and progressively diminishing maximum value. FIGURE 3 illustrates typical values of current in an inductance for given elapsed times after application of a given D.C. voltage. For example, if a voltage is applied to the inductive device for a time $t_1$, the current will eventually build up to a relatively high value $i_1$. If now the same voltage value is applied for a time $t_2$, the current in the inductive device will only build up to a value $i_2$. As this process is continued, and the duration of the applied D.C. voltage is progressively reduced to $t_3, t_4, t_5, t_6, t_7, t_8$ and $t_9$, the maximum current which builds up in the inductive device progressively reduces to $i_3, i_4, i_5, i_6, i_7, i_8$ and $i_9$. For a demagnetizing action, currents $i_1, i_3, i_5, i_7$ and $i_9$ may have one polarity while currents $i_2, i_4, i_6$ and $i_8$ may have the opposite polarity to successively reverse the polarity of the field of the inductive device as the field progressively diminishes.

Figure 2:
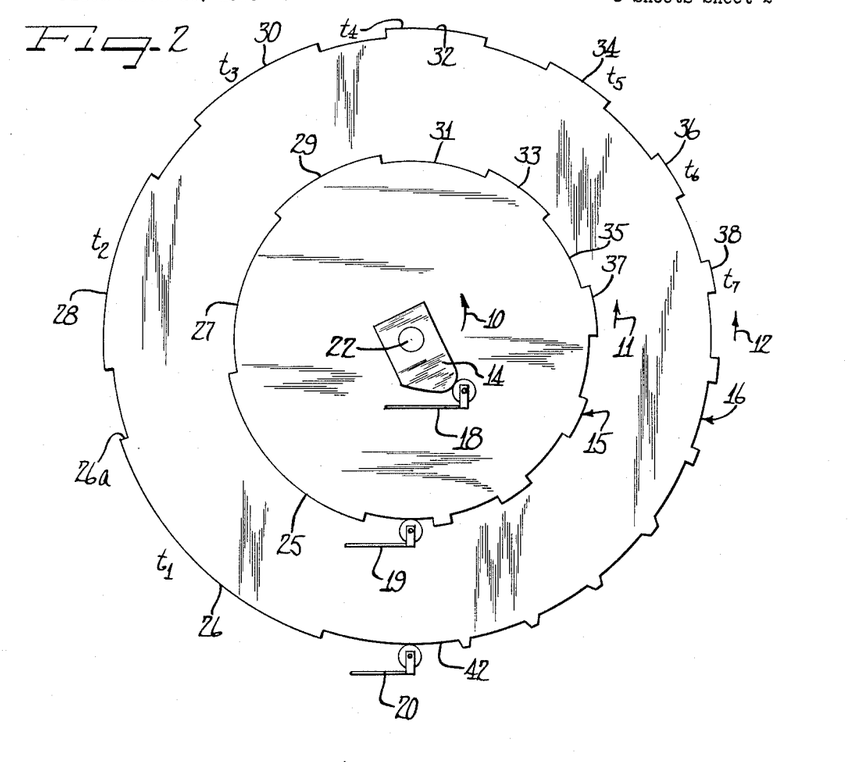
FIGURE 2 is an elevational view illustrating the principle of operation of the cam timing mechanism of FIGURE 1, but with the cams of different relative size and in a different order than in the specific physical embodiment illustrated in FIGURE 1.

FIGURE 2 illustrates the manner in which the time of application of the D.C. voltage to the inductive device may be progressively reduced, and the polarity of the applied voltage successively reversed. The arrows 10, 11 and 12 indicate the directions of rotation of the cams 14, 15 and 16. The cams may operate respective cam followers 18, 19 and 20 which control electric switches or other suitable means for accomplishing the desired functions. Cam 14 may cooperate with follower 18 to initiate and terminate the demagnetizing operation. Cam 15 in cooperation with follower 19 may be responsible for successively reversing the polarity of the voltage applied to the inductive device, while cam 16 in cooperation with follower 20 may control the duration of the applied voltage in accordance with the schedule illustrated for example in FIGURE 3. Thus when the timing motor is started to rotate the common shaft 22, cam follower 18 moves out of engagement with cam 14 to hold the timer motor in energized condition for the remainder of the demagnetizing operation. As the shaft 22 continues to rotate, the follower 19 engages the lobe 25 of cam 15 to connect the supply voltage with the inductance device in one polarity sense. Thereafter, lobe 26 engages cam follower 20 to energize the control circuit for a relatively long time interval corresponding to time $t_1$ in FIGURE 3. After the control circuit has been de-energized at point 26a on cam 16, follower 19 drops into the valley 27 of cam 15 to reverse the connections to the inductance device. Thereafter, cam follower 20 engages lobe 28 to energize the control circuit for a somewhat shorter period corresponding to time $t_2$ in FIGURE 3. After the circuit has been deenergized by lobe 28 traveling past the follower 20, polarity connections are again reversed by means of lobe 29; the control circuit is energized for a still shorter period $t_3$ by means of lobe 30; polarity is again reversed by means of valley 31; the circuit is again energized for a given shorter period $t_4$ by means of the lobe 32; polarity is reversed by means of lobe 33; the control circuit is energized for a time $t_5$ by the lobe 34; polarity is reversed by means of the valley 35; the circuit is energized for a time period $t_6$ by means of lobe 36; polarity is reversed by means of lobe 37; the circuit is energized for a shorter period $t_7$ by means of lobe 38 and so on progressively until the cam 14 again actuates the follower 18 to de-energize the timer motor at a time when the follower 20 is in the valley portion 42 so that the entire circuit is de-energized.

Description of Specific Physical Embodiment

Figure 1:
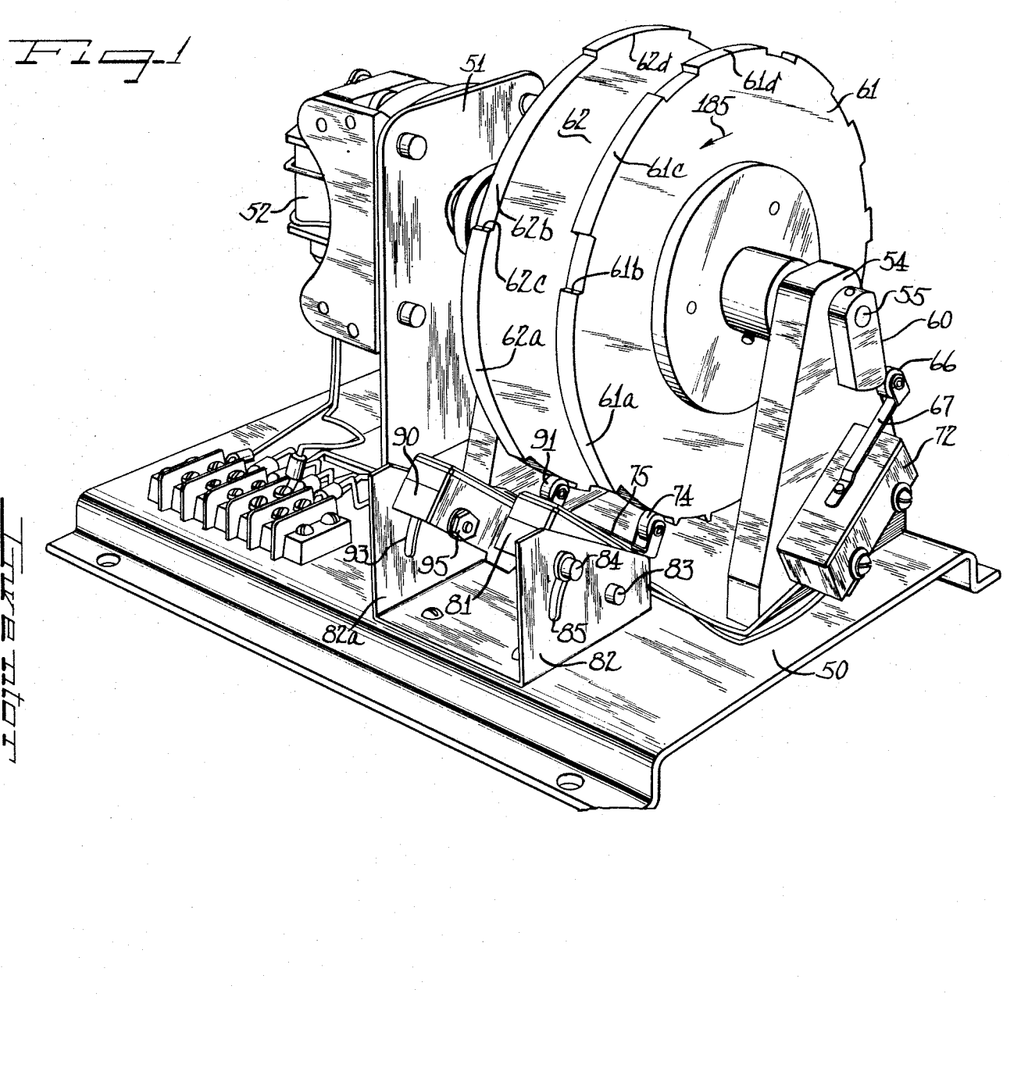
FIGURE 1 is a perspective view of a magnetizing and demagnetizing control system embodying the principles and teachings of the present invention.

Referring to FIGURE 1, a magnetizing and demagnetizing control system is illustrated which is adapted to be housed in a single enclosure by means of a cover (not shown) cooperating with the base plate 50. The base 50 carries a bracket 51 upon which the timer motor 52 is mounted and also carries a trunnion plate 54 which cooperates with the bracket 51 in mounting the timer shaft 55. Mounted on the timer shaft 55 are three timer cams corresponding to the cams 14, 15 and 16 illustrated in FIGURE 2. Cam 60 in FIGURE 1 corresponds to the cam 14 in the diagrammatic showing of FIGURE 2, cam 61 in FIGURE 1 corresponds to the cam 16 in FIGURE 2, and cam 62 in FIGURE 1 corresponds to the polarity reversing cam 15 in FIGURE 2. Cam follower 66 is carried by a switch actuating arm 67 and controls switch contact 70 in FIGURE 4 for energizing the motor 52 which is diagrammatically illustrated in FIGURE 4 and given the same reference numeral as in FIGURE 1 for convenience of reference. The switch 70 is mounted in a housing 72 shown in FIGURE 1 as carried by the trunnion 54.

Figure 4:
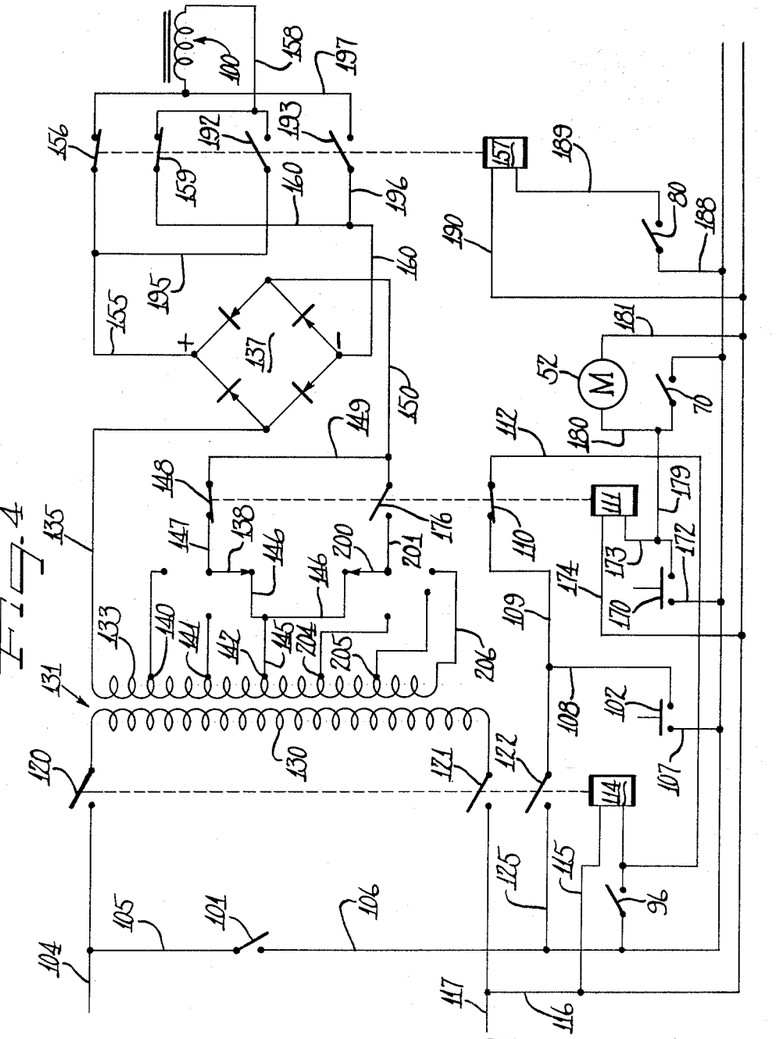
FIGURE 4 is a schematic electric circuit illustration of a magnetizing and demagnetizing system in accordance with the present invention.

Cam follower 74 in FIGURE 1 cooperates with the cam 61 and is carried by means of a switch actuating arm 75 for actuating switch contact 80 in FIGURE 4, the switch 80 being carried in a housing 81 in FIGURE 1 supported on a mounting bracket 82 and angularly adjustable thereon by means of a pivot pin 83 and a pin 84 movable in arcuate slot 85 in the bracket. Clamp means (not shown) is provided for securing the housing 81 in the desired angular position. Housing 90 for the switch operated by cam follower 91 is also angularly adjustable by means of a slot 93 in a second upstanding portion 82a of bracket 82, clamping means being indicated at 95 for clamping the housing 90 at the desired angular position. It will be understood that the housing 72 may be similarly angularly adjustable on trunnion 54 relative to the cam 60 if desired. When cam follower 91 engages the successive operating lobes of cam 62, switch 96 in FIGURE 4 is closed.

Description of the Electric Circuit of FIGURE 4

The electric circuit of FIGURE 4 will now be readily understood. When it is desired to energize the inductance device or assembly 100 for setting up a steady magnetizing field, switch 101 is manually closed and push button 102 is momentarily manually depressed. This completes an electric circuit as follows:

A.C. supply line 104, conductor 105, switch 101, conductor 106, conductor 107, push button 102, conductor 108, conductor 109, normally closed contact 110 of relay 111, conductor 112, relay 114, conductor 115, conductor 116 and supply line 117.

Relay 114 is thus energized closing contacts 120, 121 and 122. Contact 122 sets up a holding circuit for relay 114 as follows:

Supply line 104, conductor 105, switch 101, conductor 106, conductor 125, contact 122, conductor 109, contact 110, conductor 112, relay 114, conductor 115, conductor 116 and supply line 117.

The primary 130 of transformer 131 is now energized from supply lines 104 and 117 to induce a voltage across the secondary 133. Lead 135 connects one side of the secondary 133 with one input terminal of the rectifier bridge 137. Selector switch arm 138 connects with one of the secondary taps 140, 141 or 142, to apply a selected portion of the voltage from the secondary 133 to the rectifier bridge 137. In the illustrated embodiment, selector arm 138 connects with tap 142 through conductors 145 and 146, and is connected to one input terminal of the rectifier bridge 137 through conductor 147, contact 148 of relay 111, conductor 149 and conductor 150. D.C. magnetizing current is supplied from the rectifier bridge 137 to the inductance means 100 through the following circuit: conductor 155, contact 156 of relay 157, inductor 100, conductor 158, contact 159 of relay 157, and conductor 160. The inductance means 100 is thus energized with a steady or rectified current which sets up a relatively steady unidirectional magnetic field. This field may be utilized for maintaining work pieces in operative relation to a chuck or may be utilized for other purposes.

When it is desired to terminate the magnetizing action of the system, switch 101 may be opened to break the holding circuit for relay 114, or alternatively push button 170 may be depressed to energize relay 111 and break the holding circuit of relay 114 at contact 110.

If it is desired to start the demagnetizing cycle, with switch 101 closed, push button 170 is momentarily manually depressed to complete an energizing circuit for relay 111 as follows:

Supply line 104, conductor 105, switch 101, conductor 106, conductor 172, switch 170, conductor 173, relay 111, conductor 174, conductor 116, and supply line 117.

Energization of relay 111 opens contact 148, closes contact 176, and opens contact 110 to interrupt the holding circuit for relay 114 and open contacts or switch means 120, 121 and 122. Momentary closure of push button 170 also energizes motor 52 through the following circuit: conductors 173, 179, 180, motor 52, conductor 181, conductor 116 and supply line 117. As push button 170 is maintained depressed, motor 52 starts rotating shaft 55 in the direction of the arrow 185 to release cam follower 66 and close contact 70 of switch 72. Contact 70 maintains the motor energized from conductor 106 through switch 70 to conductor 180, and also maintains the relay 111 energized from conductor 106 through switch 70 to conductor 179 and conductor 173. As the shaft 55 continues to rotate, lobe 62a on cam 62 actuates follower 91 to close switch 80 associated with follower 91 and thus to energize relay 157 through the following circuit: from conductor 106 through conductor 188, switch 80, conductor 189, relay 157, conductor 190 and conductor 116. Energization of relay 157 opens contacts 156 and 159 and closes contacts 192 and 193, thus reversing the connections from the output terminals of rectifier bridge 137 to the inductance means 100. Thus relay 157 acts as a polarity reversing means. For example, the positive terminal of the bridge 137 is now connected through 155, conductor 195, contact 192 and conductor 158 to one end of the inductance means and the negative terminal is connected through conductor 160, conductor 196, contact 193 and conductor 197 to the other end of the inductance means 100.

As the cam shaft 55 continues to rotate, lobe 61a of cam 61 engages follower 74 to close contact 96 and energize relay 114 to energize the primary 130 of the transformer 131. Secondary voltage is now supplied to the rectifier bridge 137 through the conductor 135 and from the tap 142 through conductor 145, conductor 146, selector switch arm 200, conductor 201, contact 176 and conductor 150.

The selector switch 200 could be connected with secondary taps 204 or 205 or may be connected with the lower end of the secondary winding 133 by means of a conductor 206. The selector switch 200 is shown in its position for applying a minimum secondary voltage to the rectifier bridge 137. By rotating the selector switch arm 200 in the counter-clockwise direction (with the circuit deenergized) progressively larger secondary voltages would be applied to the rectifier bridge 137.

It will be appreciated that relatively low values of magnetizing current as selected by the selector arm 138 or demagnetizing current as selected by the selector arm 200 may be achieved without any resistive losses as would be required in a potentiometer type voltage adjustment. The switch 96 is maintained closed for a time period corresponding to $t_1$ in FIGURE 3 and corresponding to the length of the lobe 61a in FIGURE 1. The primary circuit is then interrupted by deenergization of the relay 114 with the consequent opening of contacts 120 and 121. Contacts 120 and 121 thus act as a circuit interrupting means and interrupt the circuit supplying voltage to the inductance assembly 100. However, there remains a low impedance current flow path at the secondary side of the transformer to prevent unduly high self-induced voltages at the inductance means 100. A complete path is available for the current induced in the inductance 100 as follows: through the contact 192 of the reversing relay 157, through the rectifier bridge 137, back through the other contact 193 of the reversing relay 157 and finally to the other side of the winding 100. After the induced current in the secondary circuit associated with the inductance 100 has had some time to dissipate itself, follower 91 is actuated by the valley portion 62b of cam 62 in FIGURE 1 to open contact 80 and deenergize the relay 157, thus opening contacts 192 and 193 and closing contacts 156 and 159. Because of the time interval between the actuation of the follower 74 at the cam edge 61b and the actuation of the follower 91 at the cam edge 62c, severe arcing at the contacts of relay 157 is prevented.

By deenergization of the relay 157, connections between the rectifier bridge 137 and the inductance 100 are reversed to reverse the magnetic field of the inductance 100 when the same is next energized by closure of the contact 96 by means of cam lobe 61c. The duration of the energization of relay 114 in this cycle is reduced to a value $t_2$ due to the shorter length of the lobe 61c as compared to the lobe 61a, so that the maximum field attained at the inductance 100 corresponds to a current $i_2$ in FIGURE 3 as compared to $i_1$ for the period $t_1$. After the field corresponding to $t_2$ is removed by deenergization of the relay 114, relay 157 is again energized by means of lobe 62d, and a field corresponding to time $t_3$ is set up by means of the lobe 61d on the cam 61.

Cycling continues in this manner with the field produced at the inductance means 100 progressively diminishing in maximum intensity in accordance with the schedule illustrated in FIGURE 3, and with the polarity successively reversing due to the alternate energization and deenergization of the relay 157. It will be observed that the applied voltage for any given demagnetizing operation remains constant at the value selected by the position of the arm 200, and that the intensity of the magnetic field is successively reduced simply by the timing of the closure of the contact 96. This is a much simpler and less expensive means for progressively reducing the demagnetizing field than the procedure of reducing the applied voltage itself.

*Summary of Operation*

In summary, before placing the system in operation, the desired magnetizing force may be selected by suitably positioning the selector switch arm 138 and the desired demagnetizing voltage maximum may be selected by suitable positioning of the selector switch arm 200. As previously mentioned, since the magnetizing current may be reduced to relatively low values, the holding power of a magnetic chuck with which the inductance 100 may be associated can be suitably adjusted to avoid deforming parts placed on the surface of the chuck, and there is no need to rely on the residual magnetization of the chuck to hold such parts.

Further, the maximum demagnetizing field may be selected to meet special circumstances as where mechanical vibration of a part increases the residual field. Further, the applied voltage to the inductance means 100 can be selected to compensate for increased time constants due to a relatively fully loaded chuck or the like so that the demagnetizing operation can be accomplished in the same time as in the case of smaller time constants.

To place the circuit in operation, as a magnetizing system, switch 101 in FIGURE 4 is closed, and push button 102 is momentarily depressed to energize relay 114 which is then held energized through contact 122 to apply A.C. supply voltage to the primary 130 of the transformer. Rectified D.C. current is supplied by the bridge 137 to the inductance 100, for example to maintain a magnetizing field in a magnetic chuck to hold parts against the chuck for machining.

When it is desired to remove the parts from the chuck, the demagnetizing cycle is initiated by depressing the push button 170 until the motor 52 has moved the cam 60, FIGURE 1, out of engagement with the follower 66 with the consequent closure of contact 70. Motor 52 then continues to drive shaft 55 to close switch 96 for progressively decreasing time intervals $t_1$, $t_2$, $t_3$, as represented in FIGURE 3 while cam 62 actuates switch 80 in FIGURE 4 to alternately energize and deenergize relay 157 to reverse the connection between the rectifier bridge 137 and inductance 100 on successive cycles of the switch 96. Since the maximum magnetizing field is dependent upon the time during which the switch 96 is closed as indicated in FIGURE 3, as the closure time of contact 96 diminishes, the maximum field strength correspondingly diminishes to apply fields of alternate polarity and progressively diminishing intensity to the parts to be demagnetized. When the demagnetizing cycle has been completed, cam 60 actuates follower 66 to open switch 70 and deenergize the apparatus.

It will be understood that the switch 101, and push button 102 and 170 may be carried in a separate remote control box with cables leading to the main unit shown in FIGURE 1 to control the unit as above described.

It will be apparent that many modifications and variations may be effected without departing from the scope of the novel concepts of the present invention.

I claim as my invention:

1. Apparatus for demagnetizing an electromagnet comprising a source of alternating current including first circuit means, rectifying means for converting the alternating current to direct current, circuit means for transmitting the direct current to the electromagnet, cycling means operable through a predetermined cycle, means controlled by said cycling means and operable at a predetermined number of intervals in a cycle of operation for interrupting said first circuit means and thus the alternating current at full voltage value of the alternating current and reestablishing it, and maintaining the alternating current so established for such period of time and at such value of voltage at the respective ones of said intervals that the magnetization imposed on the electromagnet is progressively decreased in successive ones of said intervals, and means operable during each interruption for reversing the polarity of the direct current transmitted to the electromagnet, said controlled means maintaining the alternating current for time periods of successively reduced duration between successive interruptions of said first circuit means in a cycle of operation.

2. The method of demagnetizing an electromagnet comprising, supplying alternative current, converting the alternating current to direct current and transmitting it to the electromagnet, intermittently interrupting the alternating current at full voltage value at a predetermined number of periods in a cycle, reversing the polarity of the direct current at each interruption of the alternating current, and varying the ratio between the voltage value of the current and the time interval of the period of interruption by reducing the time duration between successive interruptions of the alternating current so as to produce progressively decreased magnetization in the electromagnet in successive ones of said periods.

3. The method of demagnetizing an electromagnet comprising, supplying alternating current, converting the alternating current to direct current and transmitting it to the electromagnet, intermittently interrupting the alternating current at full voltage value at a plurality of periods in a cycle, reversing the polarity of the direct current at each interruption of the alternating current, and varying the ratio between the voltage value of the current and the time interval of the period of interruption by reducing the time duration of the transmission of direct current to the electromagnet in successive periods of said cycle so as to produce progressively decreased magnetization in the electromagnet in successive ones of said periods.

4. In a control system for controlling flow of current to an inductance means, transformer means having a primary circuit for connection to an energizing source and having a secondary circuit, rectifier means interposed in said secondary circuit and having output means for connection to said inductance means, means for successively interrupting continuity in said primary circuit of said transformer means to progressively decrease the intervals of energization of said transformer means, means for reversing polarity of output of said rectifier means, and means controlling operation of said continuity interrupting means and said polarity reversing means for supplying current pulses to the inductance means of successively opposite polarity and of progressively decreased amplitude to produce a demagnetizing field in said inductance means.

5. In a control circuit for connection with a field establishing means, transformer means having a primary for connection to an energizing source and having secondary means with a plurality of terminals at varying potential connected therewith, rectifier means having an input for connection selectively with any of said plurality of terminals of said secondary means and having an output for delivering rectified current to said field establishing means, means for energizing the primary of said transformer means at spaced intervals with the duration of successive intervals diminishing to effectively reduce the maximum field established during the successive intervals at said field establishing means, and means coupled with said primary energizing means for reversing the polarity of the field established at said field establishing means in the successive spaced intervals of energization of said primary.

6. In a control system, transformer means having a primary circuit for connection to an energizing source and having a secondary winding with a plurality of terminals connected at different potentials thereto, timing relay means having a contact controlling said primary circuit, selector means for selectively connecting with a plurality of said secondary terminals, rectifier means connected with said selector means for receiving a selected voltage from said secondary winding, reversing relay means having contacts controlling the output of said rectifier means to an inductance means, and timer means controlling said timing relay means for closing the contacts in said primary circuit at spaced intervals with the closure time of said contacts progressively diminishing to progressively reduce the maximum intensity of the demagnetizing field at the inductance means, and means for alternating the actuating and deactuating of said reversing relay means to successively reverse the polarity of the output of said rectifier means to said inductance means.

7. In a control system for controlling supply of current to an inductance means, a transformer having a primary circuit for connection to an energizing means and having a secondary winding with a plurality of terminals at different potentials, first selector means for connecting with a plurality of the terminals, second selector means for connecting with a plurality of said terminals, timing relay means having a contact in the primary circuit for controlling supply of energy to the primary circuit, selector relay means having contacts respectively in series with the first and second selector means for selectively closing circuits thereto, rectifier means connected with said secondary winding under the control of said selector relay contacts, reversing relay means having reversing contacts in the output circuit of said rectifier means for reversing the polarity of current to an inductance means, means for actuating said selector relay means to place the circuit in condition for delivery of a magnetizing current to the inductance means, and means for conditioning said circuit to supply a succession of demagnetizing pulses of reversing polarity to the inductance means.

8. In a control circuit for controlling supply of current to an inductance means, a transformer having a primary circuit for energization from a supply source, and having a secondary circuit with a plurality of terminals of varying potential connected therewith, selective connection means for selective connection with a plurality of said terminals, rectifier means connected to said secondary circuit under the control of said selective connection means, primary control relay means having normally open contacts in said primary circuit for controlling supply of energy to said primary circuit, selector relay means having normally closed contacts for controlling connection of said rectifier means with said secondary circuit, an energizing circuit via said selective connection means for said primary control relay means under the control of said selector relay means, means for deenergizing said primary control relay means upon energization of said selector relay means, magnetizing function selector means for completing said energizing circuit for said primary control relay means to energize said primary control relay means to close said normally open contacts of said primary control relay means to supply unidirectional magnetizing current from said rectifier means to said inductance means of a voltage value determined by said selective connection means, and demagnetizing function selector means for selectively energizing said selector relay means to open the normally closed contacts thereof to remove said selective connection means from between said secondary circuit and said rectifier means and to interrupt continuity in said energizing circuit of said primary control relay means to deenergize said primary control relay means and to place the circuit in condition for demagnetizing operation.

9. In a control circuit for controlling supply of current to an inductance means, a transformer having a primary connected for connection to an energizing source and having a secondary with a plurality of terminals of different potential connected therewith, selector means for selective connection with said terminals, rectifier means coupled to said secondary under the control of said selector means, reversing relay means having contacts controlling reversal of current supply to the inductance means, selector relay means having contacts controlling connection of said selector means with said rectifier means, timing relay means having contacts controlling energization of said primary, a timing contact controlling energization of said timing relay means, a reversing contact controlling energization of said reversing relay means, and motor driven timing means for closing said timing and reversing contacts in accordance with a predetermined schedule to create a desired pulsating demagnetizing field at the inductance means of progressively decreasing intensity and successively reversing polarity.

10. In a control circuit for controlling supply of current to an inductance means, a transformer having a primary for connection to an energizing source and having a secondary with a plurality of terminals at varying potential, magnetizing selector means for connection with a plurality of said terminals selectively and demagnetizing selector means for selective connection with a plurality of said terminals, rectifier means connected to said secondary under the control of said selector means, selector relay means for selectively connecting the demagnetizing and magnetizing selector means in circuit with said secondary winding and said rectifier means, reversing relay means having contacts for reversing the polarity of the output of said rectifier means, input relay means having contacts controlling energization of the primary of the transformer, a first energizing circuit for said input relay means under the control of a normally closed contact of the selector relay means, a second energizing circuit for said input relay means having a timer contact therein, first timer means for controlling said timer contact to energize said primary at spaced intervals of progressively diminishing duration, an energizing circuit for said reversing relay means controlled by a reversing contact, and second timer means synchronized with said first timer means for opening and closing said reversing contact in synchronization with said timing contact to successively reverse the current flow to the inductance means for producing a demagnetizing field at the inductance means.

11. In a control circuit for controlling supply of current to an inductance means, a transformer having a primary circuit for connection to an energizing source and having a secondary winding with a plurality of terminals connected to points of varying potential along said winding, magnetizing selector means for connecting with a plurality of said terminals selectively, demagnetizing selector means for connecting with a plurality of said terminals selectively, selector relay means having contacts in series with the respective magnetizing and demagnetizing selector means, rectifier means connected with said secondary winding under the control of said selector contacts and said selector means, reversing relay means having contacts in the output circuit of said rectifier means for reversing the polarity of output of said rectifier means to the inductance means, timing relay means having a contact in said primary circuit for controlling energization of said primary of said transformer and having a further normally open contact controlling a holding circuit for said timer relay means, a first energizing circuit for said timer relay means under the control of a normally closed contact of said selector relay means, magnetizing initiating means for completing said first energizing circuit to energize said timing means for supplying a magnetizing current to the inductance means, an energizing circuit for said selector relay means, demagnetizing initiating means for energizing said selector relay means to break the holding circuit for said timer relay means, an energizing circuit for said timer relay means under the control of a timing contact, an energizing circuit for said reversing relay means under the control of a reversing contact, and timer means for controlling the opening and closing of said timing contact and said reversing contact and operative to close said timing contact at spaced intervals of successively decreasing duration and for closing said reversing contact prior to a first closure of the timing contact, for opening the reversing contact after opening of said timing contact and for closing the reversing contact after a successive opening of the timing contact to successively reverse the polarity of current pulses supplied to the inductance means and to progressively reduce the duration of the successive current pulses.

12. In a control circuit for controlling supply of current to an inductance means, a transformer having a primary circuit for connection to an energizing source and having a secondary winding with a plurality of terminals connected to points of varying potential along said winding, magnetizing selector means for connecting with a plurality of said terminals selectively, demagnetizing selector means for connecting with a plurality of said terminals selectively, selector relay means having contacts in series with the respective magnetizing and demagnetizing selector means, rectifier means connected with said secondary winding under the control of said selector contacts and said selector means, reversing relay means having contacts in the output circuit of said rectifier means for reversing the polarity of output of said rectifier means to the inductance means, timing relay means having a contact in said primary circuit for controlling energization of said primary of said transformer and having a further normally open contact controlling a holding circuit for said timer relay means, a first energizing circuit for said timer relay means under the control of a normally closed contact of said selector relay means, magnetizing initiating means for completing said first energizing circuit to energize said timing means for supplying a magnetizing current to the inductance means, an energizing circuit for said selector relay means, demagnetizing initiating means for energizing said selector relay means to break the holding circuit for said timer relay means, an energizing circuit for said timer for said timer relay means under the control of a timing contact, an energizing circuit for said reversing relay means under the control of a reversing contact, motor timing means controlled by said demagnetizing initiating means to start a timing operation, means driven by said motor timing means for opening and closing said timing and reversing contacts in accordance with a predetermined schedule.

13. In a control circuit for controlling supply of current to an inductance means, a transformer having a primary circuit for connection to an energizing source and having a secondary circuit, rectifier means for connection to the secondary circuit and having an output circuit for connection to the inductance means, reversing relay means having contacts for reversing the polarity of the output circuit to the inductance means, timing relay means having a timing contact in the primary circuit for controlling supply of energy to the primary circuit, an energizing circuit for said reversing relay means under the control of a reversing contact, timing motor means for controlling the opening and closing of said timing contact and said reversing contact, and timer means driven by said timing motor means for closing said timing contact at spaced intervals of decreasing duration and for alternately opening and closing said reversing contact after each successive interval of closure of said timing contact.

14. In combination, a magnetic chuck having a magnetic core defining a magnetic circuit to be completed by a workpiece of magnetic material and having a winding coupled to said magnetic core to provide an inductance assembly which retains a substantial level of residual magnetization after energization of the chuck winding to retain the workpiece on the chuck during a work operation, alternating current circuit means for connection to a source of alternating current and having circuit opening contact means movable between circuit closing and circuit opening positions to successively establish and interrupt current flow in said alternating current circuit means, direct current circuit means for connection to said chuck winding and having current reversal means actuatable for supplying current of successively opposite polarity to said chuck winding, rectifier means for converting alternating current from said alternating current circuit means to unidirectional current for energizing said direct current circuit means, means for connecting said rectifier means to said alternating current circuit means under the control of said contact means for applying an alternating current voltage to said rectifier means and for connecting said rectifier means to said chuck winding under the control of said current reversal means for applying a unidirectional voltage to said chuck winding to deliver unidirectional current of polarity determined by the condition of said current reversal means to said chuck winding during a residual magnetization reducing operation, means coupled to and controlling said contact means and said current reversal means and automatically operable during a residual magnetization reducing operation: first, to move said contact means to circuit closing position with the current reversal means in a first condition to provide current flow from said rectifier means through said chuck winding in a direction to oppose the residual magnetization of the inductance assembly during a first time interval; second, to move said contact means to circuit opening position to interrupt current flow to said rectifier means and to actuate said current reversal means to a second condition; third, to move said contact means to circuit closing position with the current reversal means in the second condition to provide current flow from said rectifier means through said chuck winding in an opposite direction opposite to the first mentioned direction during a second time interval; and fourth, moving said contact means to circuit opening position to again interrupt current flow to said rectifier means, and means for reducing the magnitude of the peak value of current flow which is attained in said chuck winding in said second time interval as compared to that attained in said first time interval, said last-mentioned means comprising means for reducing the duration of said second time interval as compared to the duration of said first time interval.

15. In combination, inductance means comprising a magnetic circuit having substantial residual magnetization and an electric circuit for coupling to said magnetic circuit, alternating current circuit means for connection to a source of alternating current and having switch means shiftable between circuit closing and circuit opening conditions to successively establish and interrupt current flow in said alternating current circuit means, direct current circuit means for connection to said electric circuit of said inductance means and having current reversal means actuatable for supplying current of successively opposite polarity to said electric circuit, rectifier means for receiving alternating current from said alternating current circuit means and for supplying unidirectional current to said electric circuit, means for connecting said rectifier means to said alternating current circuit means under the control of said switch means for applying an alternating current voltage to said rectifier means and for connecting said rectifier means to said electric circuit of said inductance means under the control of said current reversal means for applying a unidirectional voltage to said electric circuit to deliver unidirectional current of polarity determined by the condition of said current reversal means to said electric circuit during a residual magnetization reducing operation, means coupled to and controlling said switch means and said current reversal means and automatically operable during a residual magnetization reducing operation: first, to actuate said switch means to circuit closing condition with the current reversal means in a first condition to provide current flow from said rectifier means through said electric circuit of said inductance means in a direction to oppose the residual magnetization of the magnetic circuit of the inductance means during a first time interval; second, to actuate said switch means to circuit opening condition to interrupt current flow to said rectifier means and to actuate said current reversal means to a second condition; third, to actuate said switch means to circuit closing condition with the current reversal means in the second condition to provide current flow from said rectifier means through said electric circuit in an opposite direction opposite to the first mentioned direction during a second time interval; and fourth, actuating said switch means to circuit opening condition to again interrupt current flow to said rectifier means, and means providing a duration of said second time interval which is substantially reduced as compared to the duration of said first time interval to reduce the magnitude of the peak value of current flow attained in said electric circuit of said inductance means in said second time interval, the duration of the second time interval being substantially less than the time required for the current flow in the electric circuit of the inductance means to reach a maximum.

16. A magnetic chuck demagnetizer control for connection to a magnetic check having a magnetic core defining a magnetic circuit to be completed by a workpiece of magnetic material and having an electric circuit coupled to said magnetic core to provide an inductance assembly which retains a substantial level of residual magnetization after energization of the chuck electric circuit to retain the work piece on the chuck during a work operation, comprising alternating current circuit means for connection to a source of alternating current and having circuit interrupting switch means shiftable between circuit interrupting and circuit completing conditions to successively interrupt and establish current flow in said alternating current circuit means, direct current circuit means for connection to said chuck electric circuit and having current reversal means actuatable for supplying current of successively opposite polarity to said chuck electric circuit, full wave rectifier means for receiving alternating current from said alternating current circuit means and for supplying full wave rectified current to said chuck electric circuit, means for connecting said full wave rectifier means to said alternating current circuit means under the control of said circuit interrupting switch means for applying an alternating current voltage to said full wave rectifier means and for connecting said full wave rectifier means to said chuck electric circuit under the control of said current reversal means for applying a full wave rectified voltage to said chuck electric circuit to deliver unidirectional current of polarity determined by the condition of said current reversal means to said chuck electric circuit during a residual magnetization reducing operation, means coupled to and controlling said switch means and said current reversal means and automatically operable during a residual magnetization reducing operation: first, to actuate said switch means to circuit completing condition with the current reversal means in a first condition to provide full wave rectified current flow from said full wave rectifier means through said chuck electric circuit in a direction to oppose the residual magnetization of the chuck magnetic circuit during a first time interval; second, to actuate said switch means to circuit interrupting condition to interrupt current flow to said full wave rectifier means and to actuate said current reversal means to a second condition; third, to actuate said switch means to circuit completing condition with the current reversal means in the second condition to provide current flow from said full wave rectifier means through said chuck electric circuit in an opposite direction opposite to the first mentioned direction during a second time interval; and fourth, actuating said switch means to circuit interrupting condition to again interrupt current flow to said full wave rectifier means, and means for reducing the magnitude of the peak value of full wave rectified current flow which is attained in said chuck electric circuit in said second time interval as compared to that attained in said first time interval, said last-mentioned means comprising means for reducing the duration of said second time interval as compared to the duration of said first time interval.

17. In combination, a magnetic chuck having a magnetic core defining a magnetic circuit to be completed by a workpiece of magnetic material and having an electric circuit coupled to said magnetic core to provide an inductance assembly which retains a substantial level of residual magnetization after energization of the chuck electric circuit to retain the workpiece on the chuck during a work operation, alternating current circuit means for connection to a source of alternating current and having circuit interrupting switch means shiftable between circuit interrupting and circuit completing conditions to successively interrupt and establish current flow in said alternating current circuit means, direct current circuit means for connection to said chuck electric circuit and having current reversal means actuatable for supplying current of successively opposite polarity to said chuck electric circuit, full wave rectifier means for receiving alternating current from said alternating current circuit means and for delivering full wave rectified current to said direct current circuit means, means for connecting said full wave rectifier means to said alternating current circuit means under the control of said switch means for applying an alternating current voltage to said full wave rectifier means and for connecting said full wave rectifier means to said chuck electric circuit under the control of said current reversal means for applying a full wave rectified voltage to said chuck electric circuit to deliver full wave rectified current of polarity determined by the condition of said current reversal means to said chuck electric circuit during a residual magnetization reducing operation, means coupled to and controlling said switch means and said current reversal means and automatically operable during a residual magnetization reducing operation: first, to actuate said switch means to circuit completing condition with the current reversal means in a first condition to provide current flow from said full wave rectifier means through said chuck electric circuit in a direction to oppose the residual magnetization of the magnetic circuit of the chuck during a first time interval; second, to actuate said switch means to circuit interrupting condition to interrupt current flow to said full wave rectifier means and after a substantial time delay to actuate said current reversal means to a second condition; third, to actuate said switch means to circuit completing condition with the current reversal means in the second condition to provide current flow from said full wave rectifier means through said chuck electric circuit in an opposite direction opposite to the first mentioned direction in a second time interval; and fourth, actuating said switch means to circuit interrupting condition to again interrupt current flow to said full wave rectifier means, means for reducing the magnitude of the peak valve of current flow which is attained in said chuck electric circuit in said second time interval as compared to that attained in said first time interval, and said current reversal means in said first condition and said full wave rectifier means providing a low impedance current flow path across said chuck electric circuit upon actuation of said switch means to circuit interrupting condition after said first time interval, and said current reversal means in said second condition and said full wave rectifier means providing a low impedance current flow path across said chuck electric circuit after said second time interval.

18. In combination, a magnetic chuck having a magnetic core defining a magnetic circuit to be completed by a workpiece of magnetic material and having an electric circuit coupled to said magnetic core to provide an inductance assembly which retains a substantial level of residual magnetization after energization of the chuck electric circuit to retain the workpiece on the chuck during a work operation, alternating current circuit means for connection to a source of alternating current, direct current circuit means for connection to the chuck electric circuit, rectifier means for receiving alternating current from said alternating current circuit means and for supplying rectified current to said direct current circuit means, electrically actuatable relay means having circuit interrupting contact means in said alternating current circuit means movable between circuit opening and circuit closing conditions for controlling supply of alternating current to said rectifying means and having current reversal contact means in said direct current circuit means movable between first and second polarity conditions for controlling the polarity of current supplied to said chuck electric circuit from said rectifier means, means coupled to and controlling said relay means and automatically operable during a residual magnetization reducing operation: first, to actuate said relay means to place said circuit interrupting contact means in circuit closing condition with the current reversal contact means in the first condition to provide current flow from the rectifier means through the chuck electric circuit in a direction to oppose the residual magnetization of the chuck magnetic circuit during a first time interval; second, to actuate said relay means to place said contact means in circuit opening condition and to actuate the current reversal contact means to the second condition; third, to actuate said relay means to place said contact means in circuit closing condition with the current reversal contact means in the second condition to provide current flow from the rectifier means through said chuck electric circuit in an opposite direction opposite to the first mentioned direction during a second time interval; and fourth, to actuate said relay means to place said contact means in circuit opening condition, and means for reducing the magnitude of the peak value of current flow which is attained in said chuck electric circuit in said second time interval as compared to that attained in said chuck electric circuit during said first time interval.

19. A control system for reducing the residual magnetization of an inductance means including a magnetic circuit and an electric circuit comprising alternating current circuit means for connection to a source of alternating current and having switch means shiftable between circuit completing and circuit interrupting conditions to successively establish and interrupt current flow in said alternating current circuit means, direct current circuit means for connection to said electric circuit of said inductance means and having current reversal means actuatable for supplying current of successively opposite polarity to said electric circuit, rectifier means for receiving alternating current from said alternating current circuit means and for delivering rectified current to said electric circuit of said inductance means, means for connecting said rectifier means to said alternating current circuit means under the control of said switch means for applying an alternating current voltage to said rectifier means and for connecting said rectifier means to said electric circuit of said inductance means under the control of said current reversal means for applying a unidirectional voltage to said electric circuit to deliver unidirectional current of polarity determined by the condition of said current reversal means to said electric circuit during a residual magnetization reducing operation, means coupled to and controlling said switch means and said current reversal means and automatically operable during a residual magnetization reducing operation: first, to actuate said switch means to circuit completing condition with the current reversal means in a first condition to provide current flow from said rectifier means through said electric circuit of said inductance means in a direction to oppose the residual magnetization of the magnetic circuit of the inductance means during a first time interval; second, to actuate said switch means to circuit interrupting condition to interrupt current flow to said rectifier means and to actuate said current reversal means to a second condition; third, to actuate said switch means to circuit completing condition with the current reversal means in the second condition to provide current flow from the rectifier means through the electric circuit of the inductance means in an opposite direction opposite to the first mentioned direction during a second time interval; and fourth, actuating said switch means to circuit interrupting condition to again interrupt current flow to said rectifier means, means for reducing the magnitude of the peak value of current flow which is attained in said electric circuit of said inductance means in said second time interval as compared to that attained in said first time interval, and means for altering the product of the amplitude of the unidirectional voltage applied to the electric circuit in the respective time intervals and the duration of the respective time intervals to adjust the residual magnetization reducing operation to inductance means having different time constants.

20. The method of demagnetizing magnetic material inductively associated with an electric circuit comprising, supplying alternating current, converting the alternating current to direct current and transmitting it to the elecric circuit, intermittently interrupting the current to the electric circuit at full voltage value at a plurality of periods in a cycle, reversing the polarity of the direct current at each interruption, and progressively reducing the time intervals between successive current interruptions while maintaining the voltage applied to the electric circuit at its initial level to produce progressively decreased magnetization of the magnetic circuit in successive ones of said periods.

21. The method of demagnetizing an electromagnet which is energized to retain variable quantities of magnetic material therewith and which exhibits a substantial residual magnetization after deenergization thereof comprising, supplying alternating current, converting the alternating current to direct current voltage, applying a full voltage value of direct current voltage to the electromagnet, intermittently interrupting the application of said direct current voltage to the electromagnet at a plurality of periods in a cycle, reversing the polarity of the direct current voltage at each interruption of the application of said direct current voltage, maintaining the magnitude of the direct current voltage at said full voltage value during the time intervals between successive interruptions and progressively decreasing the time intervals of application of said direct current voltage of said full voltage value to said electromagnet by substantial increments so as to produce progressively decreased magnetization in the electromagnet in successive ones of said periods, and adjusting the amplitude of said full voltage value of direct current voltage applied to said electromagnet to carry out the demagnetizing operation in a period of approximately six seconds regardless of the time constant of the electromagnet together with its retained magnetic material within a substantial range of time constants.

22. Apparatus for reducing the residual magnetization of magnetic material inductively coupled with an electric circuit and forming therewith an inductance assembly comprising circuit means for supplying a unidirectional voltage to the electric circuit of the inductance assembly, circuit interrupting means controlling said circuit means and movable between circuit completing and circuit interrupting positions to control supply of unidirectional voltage to the electric circuit of the inductance assembly, polarity reversing means controlling the polarity of the unidirectional voltage which is supplied to the electric circuit of the inductance assembly and shiftable between successive polarity conditions to supply unidirectional voltage of successively opposite polarity to the electric circuit of the inductance assembly, automatically operable means controlling said circuit interrupting means and said polarity reversing means and successively actuating said circuit interrupting means and said polarity reversing means to supply unidirectional voltage of successively opposite polarity in respective active time intervals to the electric circuit of the inductance assembly with the active time intervals being of successively reduced duration, and means maintaining the magnitude of the unidirectional voltage supplied to the electric circuit of the inductance assembly at substantially the same level in the successive active time intervals.

References Cited in the file of this patent

UNITED STATES PATENTS

| | | |
|---|---|---|
| 733,637 | Forster | July 14, 1903 |
| 2,183,653 | Miller | Dec. 19, 1939 |
| 2,195,017 | Ward | Mar. 26, 1940 |
| 2,444,209 | Pond | June 29, 1948 |
| 2,445,459 | Snyder | July 20, 1948 |
| 2,632,035 | Jaeger | Mar. 17, 1953 |
| 2,786,970 | Connoy | Mar. 26, 1957 |
| 2,792,468 | Kozikowski | May 14, 1957 |
| 2,825,854 | Littwin | Mar. 4, 1958 |

FOREIGN PATENTS

| | | |
|---|---|---|
| 461,203 | Great Britain | Feb. 12, 1937 |
| 537,693 | Great Britain | July 2, 1941 |